US012140886B2

(12) United States Patent
Nedelin et al.

(10) Patent No.: US 12,140,886 B2
(45) Date of Patent: Nov. 12, 2024

(54) PRINTER WITH AIRFLOW MODULE

(71) Applicant: Hewlett-Packard Development Company, L.P., Spring, TX (US)

(72) Inventors: Peter Nedelin, Ness Ziona (IL); Mark Sandler, Ness Ziona (IL); Assaf Pines, Ness Ziona (IL)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 18/246,378

(22) PCT Filed: Sep. 24, 2020

(86) PCT No.: PCT/US2020/052467
§ 371 (c)(1),
(2) Date: Mar. 23, 2023

(87) PCT Pub. No.: WO2022/066157
PCT Pub. Date: Mar. 31, 2022

(65) Prior Publication Data

US 2023/0359138 A1 Nov. 9, 2023

(51) Int. Cl.

| | |
|---|---|
| ***G03G 15/10*** | (2006.01) |
| ***B41J 2/00*** | (2006.01) |
| ***B41J 2/17*** | (2006.01) |
| ***G03G 15/11*** | (2006.01) |
| ***G03G 21/00*** | (2006.01) |
| *B41J 2/185* | (2006.01) |
| *G03G 15/16* | (2006.01) |

(52) U.S. Cl.
CPC ............ *G03G 15/11* (2013.01); *B41J 2/1714* (2013.01); *G03G 21/0088* (2013.01); *B41J 2002/1853* (2013.01); *G03G 15/1605* (2013.01)

(58) Field of Classification Search
CPC .. G03G 15/107; G03G 15/11; G03G 21/0088; G03G 21/10; G03G 21/206; G03G 2221/1645; B41J 2/1714; B41J 2/1721; B41J 2002/1853; B41J 29/377
USPC ...................... 399/92, 250, 251; 347/90, 102
See application file for complete search history.

(56) References Cited

U.S. PATENT DOCUMENTS

| | | | |
|---|---|---|---|
| 6,464,327 | B1 | 10/2002 | Eckard et al. |
| 7,604,332 | B2 | 10/2009 | Nagashima |
| 8,939,545 | B2 | 1/2015 | Tunmore et al. |
| 9,586,403 | B2 | 3/2017 | Andres |
| 2004/0228646 | A1 | 11/2004 | Sekiguchi et al. |

(Continued)

FOREIGN PATENT DOCUMENTS

| | | | | |
|---|---|---|---|---|
| GB | 2578118 A * | 4/2020 | | B41J 2/1714 |
| JP | 56-096446 U | 7/1981 | | |

(Continued)

*Primary Examiner* — Robert B Beatty
(74) *Attorney, Agent, or Firm* — Jordan IP Law, LLC

(57) ABSTRACT

A printing apparatus has a transfer member to receive an image and transfer the image to a substrate, and an airflow management unit disposed adjacent to the transfer member to define a channel between the transfer member and the airflow management unit. The airflow management unit has an injection mechanism to inject airflow into the channel, a suction mechanism to remove the airflow from the channel, and a vortex generator to generate a vortex within the channel.

12 Claims, 6 Drawing Sheets

(56) References Cited

U.S. PATENT DOCUMENTS

| | | | | |
|---|---|---|---|---|
| 2009/0244180 | A1 * | 10/2009 | Panchawagh | B41J 2/02 347/44 |
| 2012/0133708 | A1 * | 5/2012 | Miller | B41J 25/308 347/37 |
| 2016/0271950 | A1 * | 9/2016 | Imahashi | B41J 2/165 |
| 2017/0173961 | A1 * | 6/2017 | De Saint Romain | B41J 29/377 |
| 2019/0152233 | A1 * | 5/2019 | Barnett | B41J 2/105 |
| 2020/0130350 | A1 * | 4/2020 | Hara | B41J 11/0022 |
| 2020/0262207 | A1 * | 8/2020 | Nakamura | B41J 2/185 |

FOREIGN PATENT DOCUMENTS

| | | | | | |
|---|---|---|---|---|---|
| JP | 56-110972 | A | | 9/1981 | |
| JP | 2007-331169 | A | | 12/2007 | |
| JP | 2020082474 | A | * | 6/2020 | B41J 2/01 |
| KR | 10-2006-0028226 | A | | 3/2006 | |

* cited by examiner

PRINTER WITH AIRFLOW MODULE

BACKGROUND

Liquid electrophotographic printing, also referred to as liquid electrostatic printing, uses liquid print fluid to form images on a print medium. A liquid electrophotographic printer may use digitally controlled lasers to create a latent image in a charged surface of an imaging element such as a photo imaging plate (PIP). In this process, a uniform static electric charge is applied to the photo imaging plate and the lasers dissipate charge in certain areas creating the latent image in the form of an invisible electrostatic charge pattern conforming to one colour separation of the image to be printed. An electrically charged print fluid, which may be in the form of ink, is then applied and attracted to the partially charged surface of the photo imaging plate, to form an intermediate image.

In some liquid electrophotographic printers, a transfer member, such as an intermediate transfer member (ITM), is used to transfer an intermediate image to a print medium. For example, an intermediate image comprising print fluid aligned according to a latent image may be transferred from the photo imaging plate to a transfer blanket of the intermediate transfer member. From the intermediate transfer member, the intermediate image is transferred to a substrate, which is placed into contact with the transfer blanket, such that a printed image is formed on the substrate.

BRIEF DESCRIPTION OF THE DRAWINGS

Various features of the present disclosure will be apparent from the detailed description which follows, taken in conjunction with the accompanying drawings, which together illustrate features of the present disclosure, and wherein.

DETAILED DESCRIPTION

Figure 1:
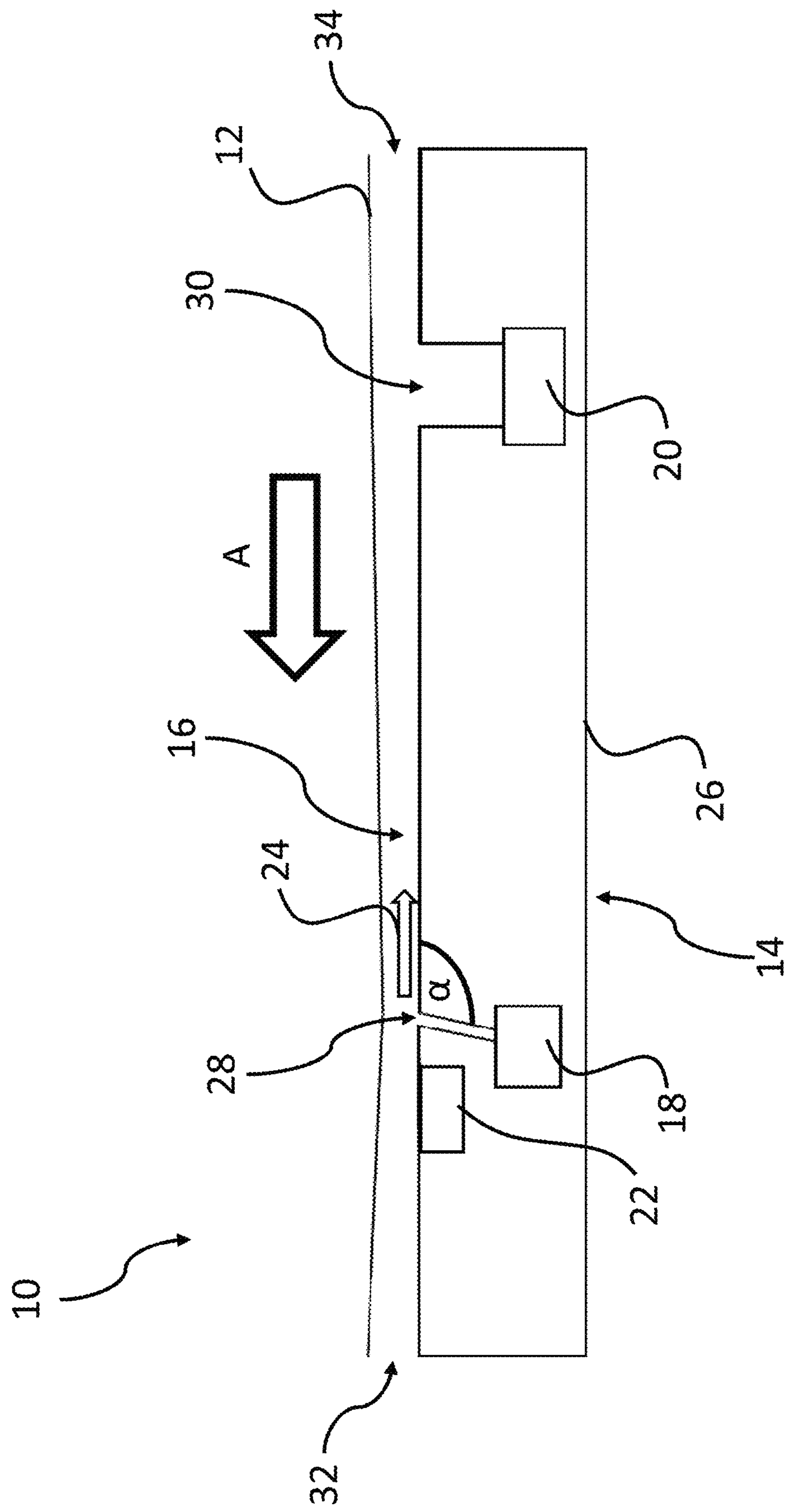
FIG. 1 is a schematic diagram showing a printing apparatus according to an example.

An example of a printing apparatus, generally designated 10, is shown schematically in FIG. 1. In some examples, the printing apparatus 10 is part of a liquid electrophotographic printer.

The printing apparatus 10 comprises a transfer member 12, and an airflow management unit 14. The view of the printing apparatus 10 shown in FIG. 1 is a view orthogonal to a direction of motion A of the transfer member 12, and shows a schematic sectional view through the airflow management unit 14. The transfer member 12 is to receive an image, for example to receive an image from a photo imaging plate (PIP), and to transfer the image to a substrate. In some examples the transfer member 12 may directly transfer the image, or a modified version of the image, to the substrate, whilst in other examples the transfer member 12 may indirectly transfer the image, or a modified version of the image, to the substrate via a further transfer member.

The airflow management unit 14 is disposed adjacent to the transfer member 12 such that a channel 16 is defined between the transfer member 12 and the airflow management unit 14. As will be discussed hereinafter, the channel 16 defines an evaporation region in which evaporation of print fluid used to form the image may occur.

The airflow management unit 14 comprises an injection mechanism 18, a suction mechanism 20, and a vortex generator 22. The injection mechanism 18 is to inject airflow 24 into the channel 16, for example such that the airflow 24 flows over the transfer member 12 in a region of the image on the transfer member 12. In some examples, such as the example of FIG. 1, the airflow management unit 14 has a housing 26, with an air outlet 28 formed in the housing, such that the injection mechanism 18 injects airflow 24 into the channel 16 via the air outlet 28.

The suction mechanism 20 is to remove the airflow from the channel 16, for example to remove the airflow from the channel 16 once the airflow has passed over the image on the transfer member 12. In some examples, such as the example of FIG. 1, the airflow management unit 14 has an air inlet 30 formed in the housing, such that the suction mechanism 20 removes the airflow from the channel 16 via the air inlet 30. In some examples the airflow management unit 14 comprises a recovery unit to recover evaporated print fluid from airflow drawn in by the suction mechanism 20, which may allow for re-use of at least part of print fluid in the printing apparatus 10.

The vortex generator 22 is to generate a vortex within the channel 16.

During use of the printing apparatus 10, the airflow 24 is injected into the channel 16 by the injection mechanism 18 such that the airflow 24 is able to flow within the channel 16 over a region of the transfer member 12 on which the image is disposed. In some examples the airflow 24 is heated, and the heated airflow 24 causes evaporation of one or more component liquids of the image, such that airflow within the channel 16 contains vapor from evaporation of the print fluid. Thus, the channel 16 may be thought of as an evaporation region. Some print fluids comprise volatile organic compounds (VOCs), and so it may be desirable to safely dispose of vapor from evaporation of the print fluid to prevent emissions of VOCs. It may also be desirable to recover vapor from evaporation of the print fluid even where the print fluid does not comprise a VOC.

To this end, the suction mechanism 20 is used to remove the heated airflow from the channel, such that airflow containing vapor from evaporation of the print fluid is removed from the channel 16. However, it will be appreciated that it is not possible to physically seal the channel 16 via contact with the transfer member 12, as to do so would lead to risk of contact with the image held on the transfer member, thereby risking unintentional modification of the image. Thus, the channel 16 in the example of FIG. 1 has first 32 and second 34 open ends.

The applicant has found that, during use of the printing apparatus 10 absent the vortex generator 22, airflow containing evaporated print fluid may escape from the channel 16 via the first 30 and/or second 32 open ends.

It may be possible to mitigate for such escape of airflow from the first open end 32 by tilting the air outlet 28 toward the air inlet 30. However, the applicant has found that excessive tilting of the air outlet 28 toward the air inlet 30 may enable ambient air to enter the channel 16 via the first open end 32. Such ambient air is cooler than the heated airflow injected by the injection mechanism 18, and may form a laminar boundary layer adjacent the transfer member 12. This may reduce an effectiveness of evaporation of print fluid from the image held on the transfer member.

It may be possible to mitigate for such escape of airflow from the first 32 and/or second 34 open end by increasing a level of suction applied by the suction mechanism 20. This may, however, prove to be energy intensive, and may lead to large suction flow rates.

By providing a vortex generator 22 to generate a vortex within the channel 16, the applicant has found that escape of airflow from the channel 16, and hence escape of airflow containing vapor from evaporation of print fluid from the channel 16, may be reduced. The vortex generated within the channel 16 acts to inhibit airflow from leaving the channel 16 from the first 32 and/or second 34 open ends.

Provision of the vortex generator 22 may enable the air outlet 28 of the airflow management unit 14 to be tilted to a lesser degree, which may inhibit formation of a laminar boundary layer of ambient air on the transfer member 12, and may provide increased efficiency of evaporation. In some examples, such as the example of FIG. 1, the air outlet 28 of the airflow management unit may be tilted such that the injection mechanism 18 is to inject heated airflow to the channel 16 at an angle $\alpha$ in the range of 93-101° relative to the channel 16, for example with the angle $\alpha$ measured between an outer surface of the housing 26 and a wall of the air outlet 28 or between a longitudinal axis of the channel 16 (which is substantially parallel to an outer surface of the housing 26 in the example of FIG. 1) and a wall of the air outlet 28. In some examples the angle $\alpha$ may be around 97°. In some examples the injection mechanism is to introduce injected air to the channel at an angle of no greater than 105°. In some examples the injection mechanism 18 is to inject heated airflow at a temperature in the range of 150-250° C. measured at the air outlet 28, for example at around 200° C. The injection mechanism 18 may comprise a heater and a blower, for example.

Provision of the vortex generator 22 may also or alternatively enable a reduced level of suction to be applied by the suction mechanism 20, which may reduce energy consumption and/or running costs, and may reduce a physical dimension of the suction mechanism 20. In some examples, the suction mechanism 20 is to remove airflow from the channel 16 at a flow rate of no more than 150 L/s per meter, a flow rate of no more than 100 L/s per meter, a flow rate of no more than 50 L/s per meter, a flow rate of no more than 30 L/S per meter, or a flow rate of no more than 20 L/S per meter. In some examples, the suction mechanism 20 is to remove airflow from the channel 16 at a flow rate of around 50 L/s per meter.

In some examples the vortex generator 22 is a passive element, for example an element which generates a vortex within the channel 16 without requiring the application of any energy thereto, other than energy in the heated airflow itself. Such a passive element may lead to a reduced level of energy consumption compared to, for example, an active element which uses energy input to generate a vortex within the channel. The passive element may comprise a static structure, for example a structure comprising no moving parts.

In some examples, the vortex generator 22 is to generate a region of low pressure in the channel 16. For example, the vortex generator 22 may generate a region of relatively low pressure within the channel 16 compared to the pressure within the remainder of the channel 16. In some examples the vortex generator 22 is to generate a vortex within the channel 16 rotating about an axis substantially orthogonal to the direction of motion A of the transfer member 12. Such a vortex may create an air seal within the channel 16, which may inhibit escape of airflow from the channel 16, and hence escape of airflow containing vapor from evaporation of the print fluid from the channel 16, from the first 32 and/or second 34 open ends depending upon location of the vortex generator. A vortex may comprise a region in a fluid in which the flow revolves around an axis line. The vortex generator 22 may comprise a vortex generator disposed within the channel 16. Generation of a vortex within the channel 16 may modify a direction of at least some airflow within the channel 16 such that an air seal is created within the channel 16 at a desired location, thereby inhibiting leakage of airflow containing evaporated print fluid from the first 32 and/or second 3 open ends of the channel 16. Generation of a vortex may also allow for mixing of ambient airflow entering the channel 16 from the first 32 and/or second 34 open ends with the heated airflow injected by the injection mechanism 18, which may provide increased efficiency of evaporation compared to, for example, an arrangement where colder ambient air is allowed to flow within the channel in a laminar manner.

In some examples, such as the example of FIG. 1, the channel 16 is open at either end, with the first 32 and second 34 open ends, and the vortex generator 22 is located between the injection mechanism 18 and the first open end 32, for example between the air outlet 28 and the first open end 32. Airflow containing evaporated print fluid may be less prone to leak from the second open end 34 in view of the suction mechanism 20, and so locating the vortex generator 22 between the injection mechanism 18 and the first open end 32 may inhibit leakage of airflow containing evaporated print fluid from the first open end 32 of the channel 16, where such leakage is more likely to occur. It will, however, be appreciated that in other examples the vortex generator 22 may be located between the suction mechanism 20 and the second open end 34 of the channel 16, or indeed that in other examples plural vortex generators 22 may be provided at different respective locations along the length of the channel 16.

In the example of FIG. 1, the injection mechanism 18 is located upstream of the suction mechanism 20, and between the vortex generator 22 and the suction mechanism 20, with the air outlet 28 located upstream of the air inlet 30, and the air outlet 28 between the vortex generator 22 and the air inlet 30. Thus, the heated airflow injected into the channel 16 through the air inlet 28 may flow through the channel 16 and over the image held on the transfer member 12 to evaporate print fluid, before then being subsequently removed from the channel 16 by the suction mechanism 20, with the vortex generator 22 inhibiting leakage of airflow containing evaporated print fluid in an upstream direction. It will be recognised that here upstream is used in relation to the direction of airflow within the printing apparatus 10, and that in the example of FIG. 1 the flow of airflow within the channel 16 from an upstream location to a downstream location, for example from the air inlet 28 to the air outlet 30, is substantially opposite to the direction of motion A of the transfer member 12. Where the direction of motion A of the transfer member 12 is opposite to the direction of airflow from the air inlet 28 to the air outlet, motion of the transfer member 12 may encourage leakage of airflow containing evaporated print fluid from the first open end 32 of the channel 16, and provision of the vortex generator 22 in such examples may mitigate for this.

In other examples, the flow of airflow within the channel 16 from an upstream location to a downstream location, for example from the air inlet 28 to the air outlet 30, may be in the same direction as the direction of motion A of the transfer member 12. Here the vortex generator 22 may also inhibit leakage of airflow containing evaporated print fluid from the channel 16.

In some examples, such as the example of FIG. 1, the transfer member 12 is heated to modify the image held thereon prior to transfer of the image to the substrate. Heating of the transfer member 12 may cause partial melting of print fluid, for example pigment particles of print fluid, forming the image to blend together into a film, with the film then subsequently being transferred to the substrate, either directly or indirectly. Such heating may also assist with evaporation of print fluid, for example evaporation of a carrier fluid component of the print fluid.

Figure 2:
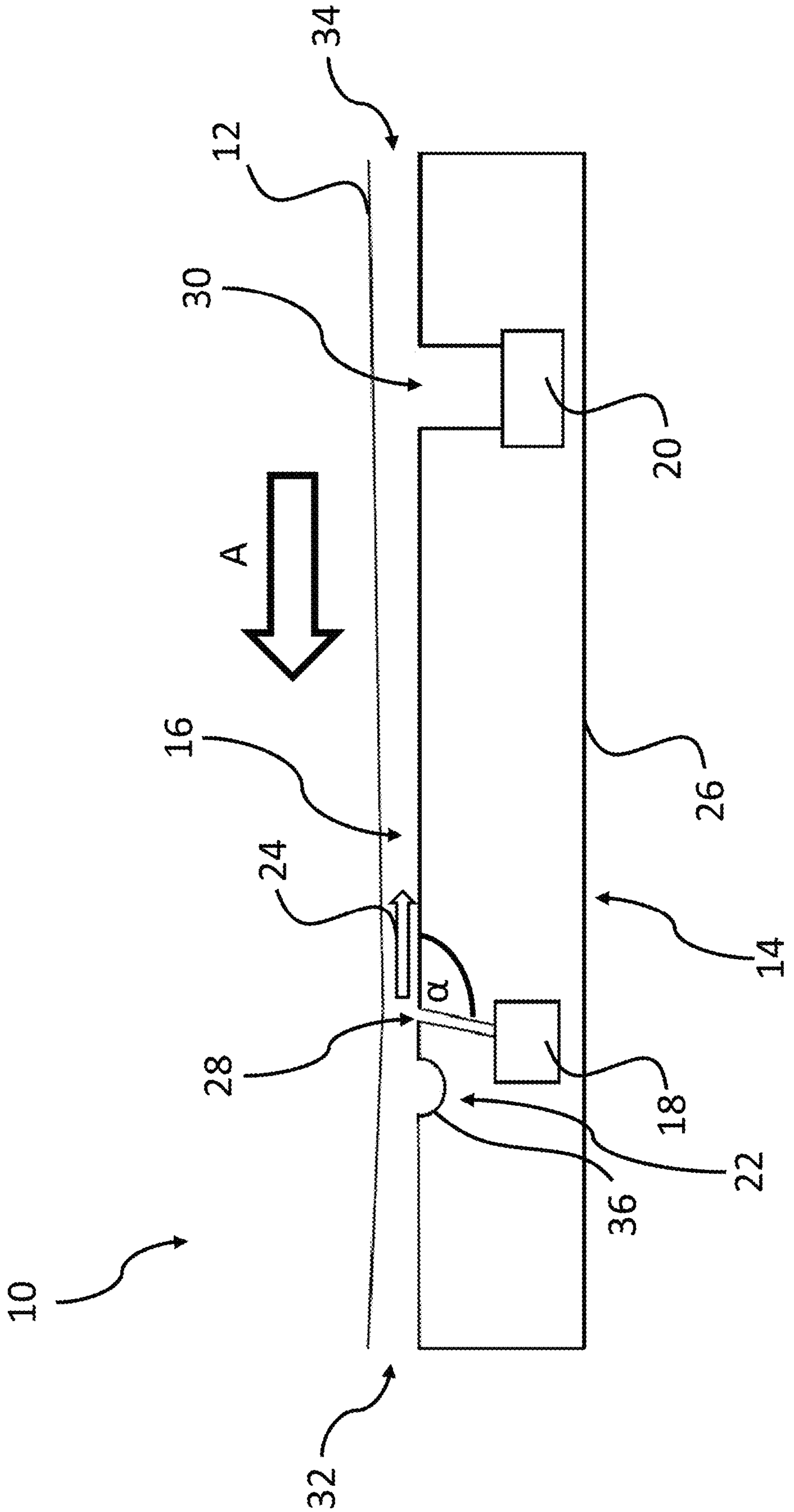
FIG. 2 is a schematic diagram showing a printing apparatus according to another example.

Another example of the printing apparatus 10 is shown schematically in FIG. 2. Here the vortex generator 22 comprises a recess 36 formed in an outer surface of the housing 26 of the airflow management unit 14, such that the recess 36 is exposed to airflow within the channel 22. The recess 36 has been found by the applicants to act as a passive vortex generator, which may inhibit leakage of airflow containing evaporated print fluid from the first open end 32 of the channel 16, as previously discussed. The recess 36 may be considered to define an increase in width of the channel 16 in the region of the recess 36. It will be appreciated that the relative size of the recess 36 compared to the channel 16 has been exaggerated in FIG. 2 for ease of clarity.

The recess 36 in some examples, such as the example of FIG. 2, extends along the housing 26 in a direction substantially orthogonal to the direction of motion A of the transfer member 12, for example such that the recess 36 may be thought of as extending transversely relative to the transfer member 12. In some examples a length of the recess is greater than or equal to a width of the transfer member 12. This may inhibit leakage of airflow containing evaporated print fluid from the channel 16 across substantially the entire width of the transfer member 12, for example across substantially the entire width of the channel 16.

In the example of FIG. 2, the recess 36 comprises a substantially semi-circular cross-sectional profile, for example such that the recess 36 has the form of a curved groove or trough formed in the housing 26. The applicant has found that such a shape of recess 36 may modify a direction of airflow within the channel 16 by generating a vortex within the channel 16, in a manner that may allow for increased inhibition of leakage of airflow containing evaporated print fluid from the channel 16 compared to recesses of other shapes. However, it will be appreciated that recesses comprising profiles having other shapes may also be utilised.

In the example of FIG. 2, there is one recess 36. This has been found by the applicant to be sufficient to generate a desired vortex within the channel 16. In other examples, more than one recess 36 may be provided, with each recess having a similar form, or different recesses having different forms. The number and form of recesses may be altered to provide desired flow characteristics within the channel 16.

Figure 3:
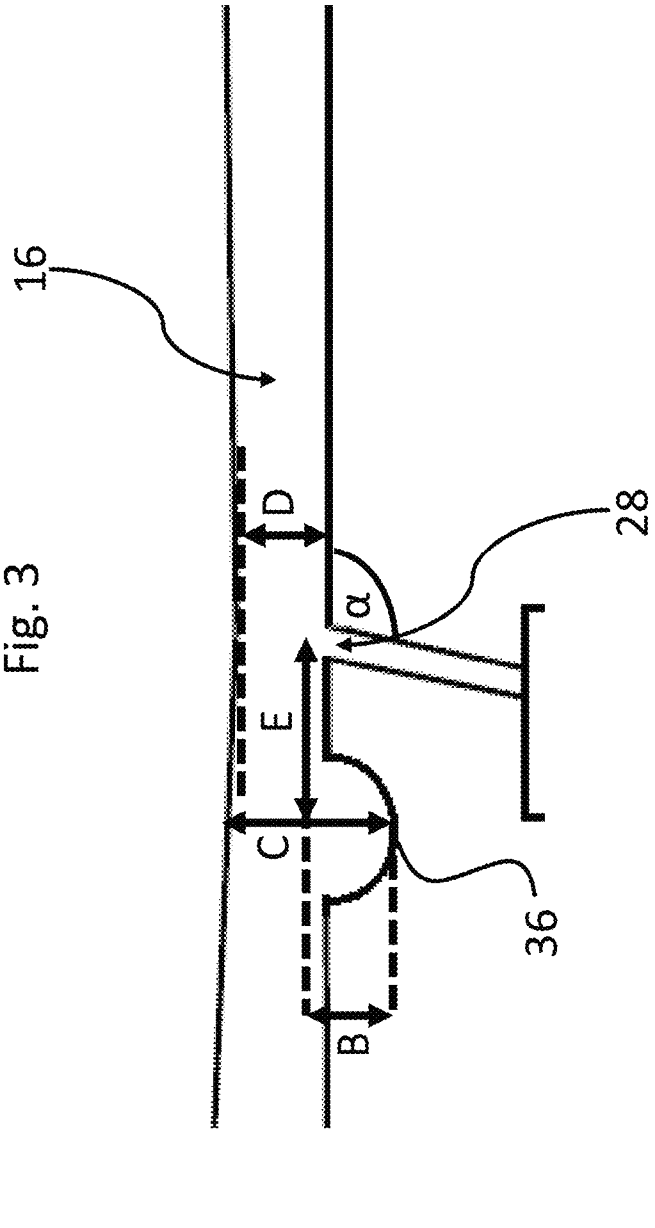
FIG. 3 is an enlarged view of a portion of the printing apparatus of FIG. 2.

An enlarged view of the area surrounding the recess 36 is shown in FIG. 3.

As shown in the example of FIG. 3, the channel 16 has a minimal depth D. The minimal depth D is the smallest depth of the channel 16. In some examples the minimal depth D is in the region of 3.2-4.2 mm, for example around 3.7 mm. In the example of FIG. 3 the recess 36 has a depth B in the region of 0.2-0.5 times the minimal depth D of the channel 16, for example around 0.4 times the minimal depth of the channel 16. In some examples the depth B of the recess 36 is in the region of 0.6-2.1 mm, for example around 1.5 mm.

In the example of FIG. 3, the channel 16 has a depth C in the region of 1.1-1.3 times the minimal depth D in the region of the recess 36, for example with the depth of the recess 36 contributing to the depth of the channel 16 in the region of the recess 36. In some examples the depth C of the channel 16 in the region of the recess 36 is around 1.2 times the minimal depth D of the channel 16. In some examples the depth C of the channel 16 in the region of the recess 36 is in the region of 3.5-5.5 mm, for example around 4.5 mm.

In the example of FIG. 3, the recess 36 is spaced from the air outlet 28 of the housing 26 by a distance E, for example with the distance E measured between a middle of the recess, ie a center point of the semi-circular profile of the recess 36 in the example of FIG. 3, and a center point of the air outlet 28. In some examples, such as the example of FIG. 3, the distance E by which the recess 36 is spaced from the air outlet 28 is in the region of 1.0-1.2 times the minimal depth D, for example around 1.1 times the minimal depth D. In some examples the distance E by which the recess 36 is spaced from the air outlet 28 is in the region of 3.2-5.1 mm, for example around 4.5 mm.

The geometries and dimensions discussed above in relation to the vortex generator 22 in the form of the recess 36 have been found by the applicant to provide greater inhibition of leakage of airflow containing evaporated print fluid from the channel 16, although it will be appreciated that other geometries of recess may lead to alternative dimensions.

As previously mentioned, in some examples the printing apparatus 10 is part of a liquid electrophotographic printer (LEP). An example of a LEP 100 is shown schematically in FIG. 4, with the operation of the LEP 100 described below.

The LEP 100 comprises a photo imaging plate (PIP) 102, a charging element 104, an imaging unit 106, an image development unit 108, an intermediate transfer member 110, an airflow management unit 112 and an impression cylinder 114.

Figure 4:
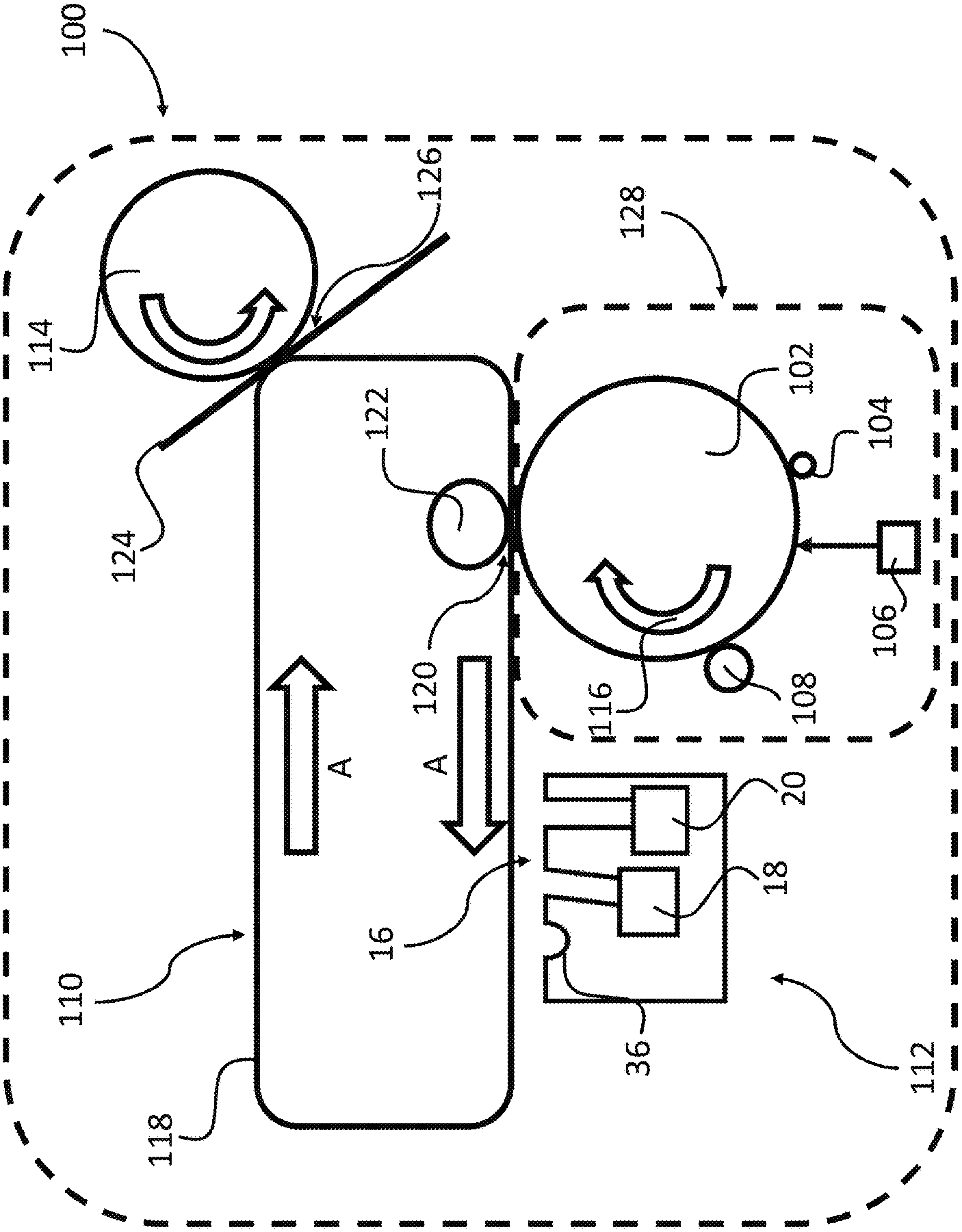
FIG. 4 is a schematic diagram showing a liquid electrophotographic printer according to an example.

In the example of FIG. 4, the photo imaging plate 102 comprises an imaging cylinder rotatable about a central axis in a direction indicated in FIG. 4 by an arrow 116. A latent image is formed on the photo imaging plate 102 by rotating a clean segment of the photo imaging plate 102 under the charging element 104. The charging element 104 may include a charging device, such as corona wire, a charge roller, scorotron, or any other charging device. A uniform static charge is deposited on the photo imaging plate 102 by the charging element 104.

As the photo imaging plate 102 continues to rotate, it passes the imaging unit 106 where one or more lasers dissipate localized charge in selected portions of the photo imaging plate 102 to leave an invisible electrostatic charge pattern that corresponds to the image to be printed, i.e. a latent image. Print fluid is then transferred onto the photo imaging plate 102 by the image development unit 108. Although shown in FIG. 4 as having one image development unit 108, it will be appreciated that in practice there may be plural image development units 108 present, for example one for each colour. An image development unit 108 may also be referred to as a Binary Ink Developer (BID) unit in some examples. During printing, the appropriate image development unit 108 is engaged with the photo imaging plate 102. The engaged image development unit 108 presents a uniform film of print fluid to the photo imaging plate 102. The print fluid contains electrically charged pigment particles which are attracted to the image areas of the photo imaging plate 102. The photo imaging plate 102 then has a single colour print fluid image on its surface, i.e. an intermediate image.

The print fluid comprises pigment particles suspended in a carrier fluid. An example print fluid is HP ElectroInk™. In this case, pigment particles are incorporated into a resin that is suspended in a carrier fluid, such as Isopar™. In some examples the intermediate image is referred to as an inked image.

The photo imaging plate 102 continues its rotation to transfer the intermediate image to the intermediate transfer member 110. Collectively, the photo imaging plate 102, the charging element 104, the imaging unit 106, and the image development unit 108 may be thought of as an image forming unit 128.

In the example of FIG. 4, the intermediate transfer member 110 comprises a transfer blanket 118 that is movable by a movement mechanism relative to the photo imaging plate 102. In the example of FIG. 4, the transfer blanket 118 comprises a release layer made of silicone rubber, for example, polydimethylsiloxane (PDMS). The transfer blanket 118 is in contact with the photo imaging plate 102 in a contact region 120, which may sometimes be referred to as a nip. Transfer of the intermediate image from the photo imaging plate 102 to the transfer blanket 118 takes place in the contact region 120 via electrostatic attraction and physical contact. The transfer of the intermediate image from the photo imaging plate 102 to the intermediate transfer member 110 may be deemed a "first transfer", and so the contact region 120 may be referred to as the T1 nip. In the example of FIG. 4, a support roller 122 is provided to support the transfer blanket 118 at the T1 nip.

The transfer blanket 118 in the example of FIG. 4 is heated, which causes pigment particles carried on the transfer blanket 118 to partially melt and blend together into a film. Once the pigment particles are heated and merged into a film, the film is transferred to a substrate 124 at a contact region 126 between the transfer blanket 118 and the impression cylinder 114 to form a printed image on the substrate 124. The impression cylinder 114 both mechanically compresses the substrate 124 into contact with the transfer blanket 118 and also helps feed the substrate 124. The transfer of the film from the transfer blanket 118 to the substrate 124 may be deemed a "second transfer", and so the contact region 126 may be referred to as the T2 nip.

In a similar manner to that discussed above in relation to the examples of FIGS. 1 and 2, the LEP 100 comprises the airflow management unit 112 to assist with evaporation of carrier fluid when the pigment particles of the intermediate image are partially melted to form the film on the transfer blanket 118. As seen in FIG. 4, the airflow management unit 112 is located post—the T1 nip. The airflow management unit 112 has substantially the same structure as the airflow management unit 14 of FIG. 2, and so like reference numerals will be used for the sake of clarity.

The airflow management unit 112 is disposed adjacent to the transfer blanket 118 such that a channel 16 is defined between the transfer blanket 118 and the airflow management unit 14. As will be discussed hereinafter, the channel 16 defines an evaporation region in which evaporation of the carrier fluid used to form the intermediate image is to occur.

The injection mechanism 18 of the airflow management unit 112 is to inject heated airflow 24 into the channel 16, through the air outlet 28 of the housing 26, such that the heated airflow 24 flows over the transfer blanket 118 and hence over the intermediate image held on the transfer blanket 118. The heated airflow causes evaporation of the carrier fluid used to form the intermediate image, such that airflow within the channel 16 contains evaporated carrier fluid. As previously discussed, some carrier fluids of print fluids comprise volatile organic compounds (VOCs), and so it may be desirable to safely dispose of vapor from evaporation of the print fluid. The suction mechanism 20 is to remove airflow from the channel 16 once airflow has passed over the region of the intermediate image on the transfer blanket 118 via the air inlet 30 formed in the housing 26.

However, the channel 16 is open ended, with first 32 and second 34 open ends, which may provide leakage paths for airflow containing evaporated carrier fluid to leave the channel 16. The airflow management unit 112 is therefore provided with a vortex generator 22 in the form of the recess 36 discussed in the example of FIGS. 2 and 3. The recess 36 is to generate a vortex in the channel 16 between the first open end 32 and the air outlet 28 of the housing 26 through which heated airflow is introduced into the channel 16 by the injection mechanism 18.

Generation of a vortex within the channel 16 may modify a direction of at least some airflow within the channel 16 such that an air seal is created within the channel 16, thereby inhibiting leakage of airflow containing evaporated carrier fluid from the first 32 open end of the channel 16. Generation of a vortex may also allow for mixing of ambient airflow entering the channel 16 from the first 32 open end with the heated airflow injected by the injection mechanism 18, which may provide increased efficiency of evaporation compared to, for example an arrangement where colder ambient air is allowed to flow within the channel 16 in a laminar manner.

Inhibition of airflow leakage from the first open end 32 of the channel 16 may also allow for the air outlet 28 of the housing 26 to be generally orthogonal to the channel 16, which may inhibit laminar flow of ambient air adjacent the boundary of the transfer blanket 118, and may provide increased efficiency of evaporation of carrier fluid from the intermediate image held on the transfer blanket 118.

Inhibition of airflow leakage from the first open end 32 of the channel 16 may also allow for a reduced suction flow rate for the suction mechanism 20 to remove airflow containing evaporated carrier fluid from the channel 16, which may reduce associated size and component cost of hardware for the suction mechanism 20 and hence the airflow management unit 112.

Figure 5:
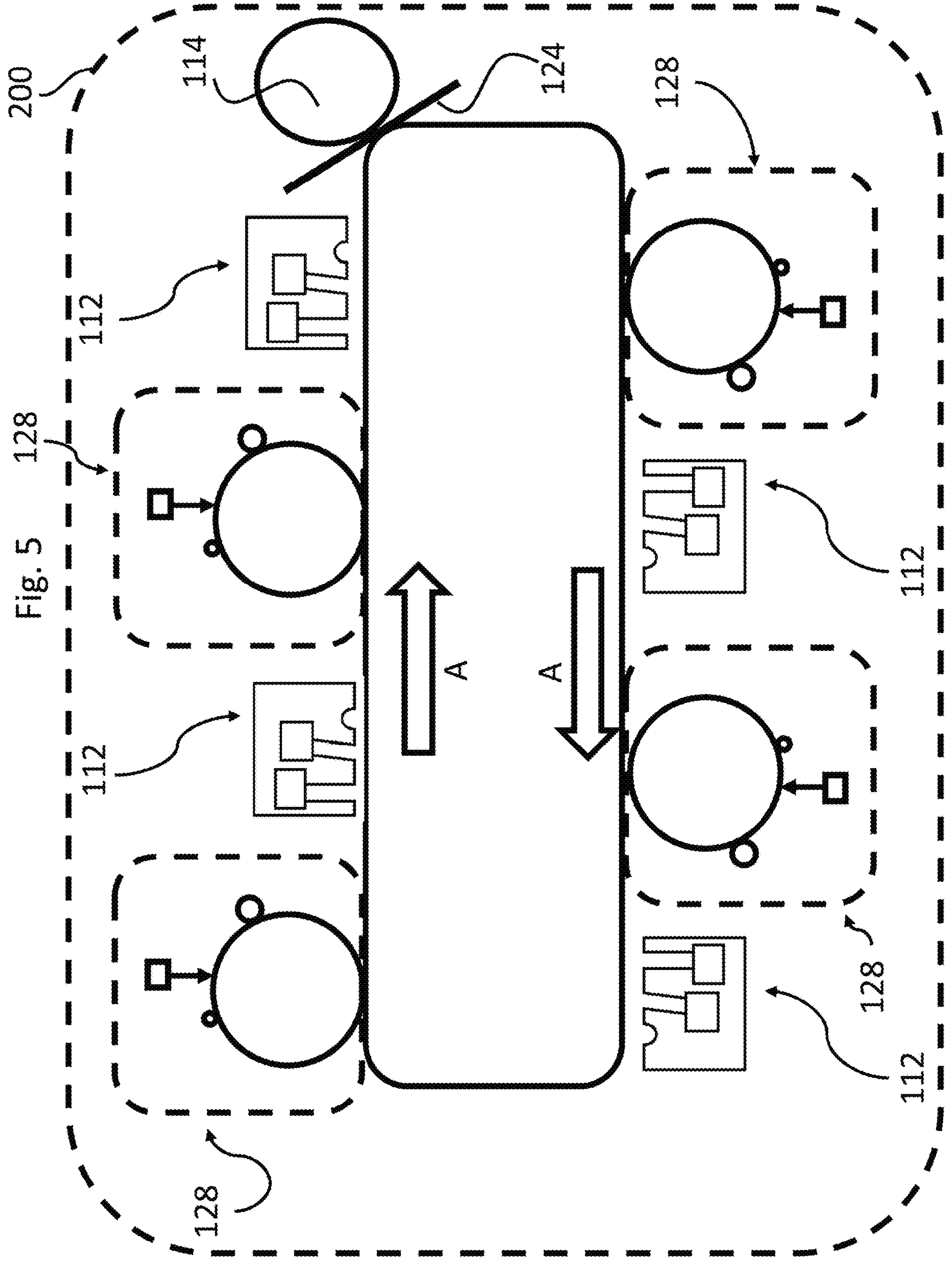
FIG. 5 is a schematic diagram showing a liquid electrophotographic printer according to another example.

Another example of a LEP 200 that utilises the printing apparatus 10 is shown schematically in FIG. 5.

Here the LEP comprises a number of image forming units 128, with each image forming unit 128 to transfer an intermediate image formed of different colour print fluid onto the transfer blanket 118. In the example of FIG. 5, an airflow management unit 112 is located post—an image forming unit 128 in the direction of motion A of the transfer blanket 118, such that carrier fluid may be evaporated and safely removed each time an intermediate image comprising carrier fluid and pigment particles is applied to the transfer blanket 118.

Figure 6:
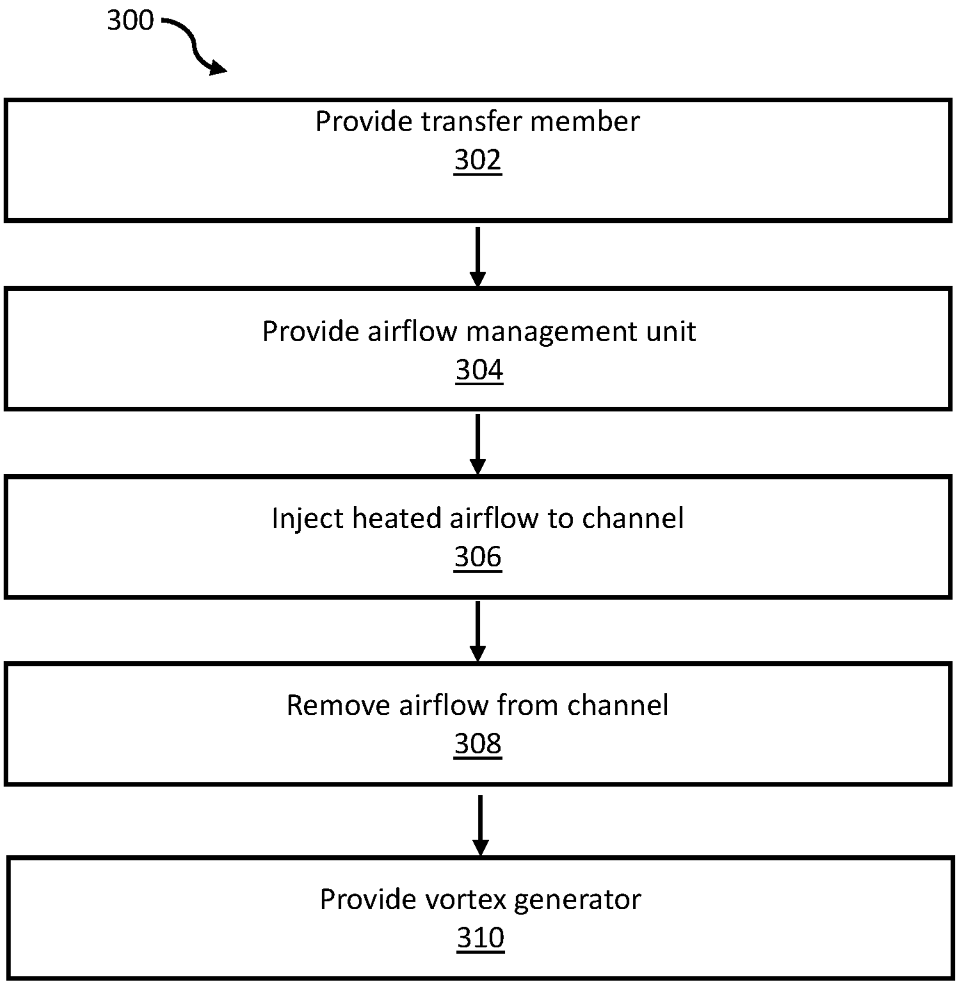
FIG. 6 is a flow chart schematically illustrating a method utilizing a printing apparatus according to an example.

A method 300 that utilises a vortex generator 22 as discussed herein is shown schematically in the flow diagram of FIG. 6. The method 300 comprises providing 302 a transfer member to receive an image and transfer the image to a substrate, and providing 304 an airflow management unit disposed adjacent to the transfer member to define a channel between the transfer member and the airflow management unit. The method 300 comprises injecting 306 a heated airflow into the channel via an air outlet of the airflow management unit, and removing 308 the heated airflow from the channel via an air inlet of the airflow management unit. The method 300 comprises providing 310 a vortex generator to generate a vortex within the channel and inhibit the heated airflow leaving the channel upstream of the air outlet.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. A printing apparatus comprising:

a transfer member to receive an image and transfer the image to a substrate; and an airflow management unit disposed adjacent to the transfer member to define a channel between the transfer member and the airflow management unit;

wherein the airflow management unit comprises an injection mechanism to inject airflow into the channel, a suction mechanism to remove the airflow from the channel, and a vortex generator to generate a vortex within the channel; and wherein the airflow management unit comprises an air outlet through which the airflow is injected into the channel by the injection mechanism, and the vortex generator generates the vortex upstream of the air outlet.

2. The printing apparatus of claim 1, wherein the vortex generator comprises a passive element.

3. The printing apparatus of claim 1, wherein the injection mechanism is to inject heated airflow into the channel.

4. The printing apparatus of claim 1, wherein the airflow management unit comprises a housing, and the vortex generator comprises a recess formed in a wall of the housing such that the vortex generator is exposed to airflow within the channel.

5. The printing apparatus of claim 4, wherein the recess comprises a semi-circular cross-sectional profile.

6. The printing apparatus of claim 1, wherein the injection mechanism is located upstream of the suction mechanism, and between the vortex generator and the suction mechanism.

7. The printing apparatus of claim 1, wherein the injection mechanism is to inject the airflow to the channel at an angle in the range of 93-101° relative to the channel.

8. The printing apparatus of claim 1, wherein the printing apparatus comprises an image forming unit to form the image received by the transfer member, the image forming unit comprising print fluid comprising pigment particles suspended in a carrier fluid.

9. The printing apparatus of claim 1, wherein the suction mechanism is to remove the airflow from the channel at flow rate of no more than 150 L/s per meter.

10. A printing apparatus comprising:

a transfer member to receive an image and transfer the image to a substrate; and an airflow management unit disposed adjacent to the transfer member to define a channel between the transfer member and the airflow management unit;

wherein the airflow management unit comprises a housing, an injection mechanism to inject airflow into the channel, a suction mechanism to remove the airflow from the channel, and a vortex generator to generate a vortex within the channel;

wherein the vortex generator comprises a recess formed in a wall of the housing such that the vortex generator is exposed to airflow within the channel; and wherein the recess comprises a depth that is between 0.2-0.5 times a minimal depth of the channel.

11. A printing apparatus comprising:

a transfer member to receive an image and transfer the image to a substrate; and an airflow management unit disposed adjacent to the transfer member to define a channel between the transfer member and the airflow management unit;

wherein the airflow management unit comprises an injection mechanism to inject airflow into the channel, a suction mechanism having an air inlet to remove the airflow from the channel, and a vortex generator to generate a vortex within the channel; and wherein the channel comprises first and second open ends, and the vortex generator is located between an air outlet through which the airflow is injected into the channel by the injection mechanism and the first open end of the channel, and the air inlet is located between the air outlet and the second end.

12. A printer comprising:

an image forming unit to form an image using print fluid comprising pigment particles suspended in a carrier fluid;

a blanket to receive the image from the image forming unit; and an airflow module spaced from the blanket to define an airflow channel having first and second open ends, the airflow module comprising an air outlet to pass heated airflow into the channel, an air inlet to receive output airflow from the airflow channel, and an airflow inhibitor located between the first open end and the air outlet of the airflow module, the air inlet located between the air outlet and the second open end of the channel, the airflow inhibitor to create an air seal in a region located between the first open end and the air outlet of the airflow module.

* * * * *